J. M. BOYLE.
MEANS FOR RENDERING CONDUITS IMPERVIOUS.
APPLICATION FILED FEB. 20, 1907.
907,724.
Patented Dec. 29, 1908.
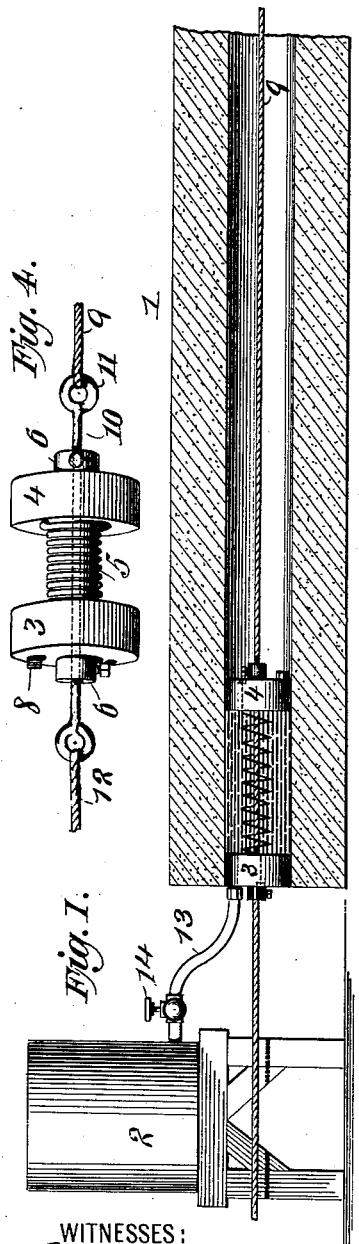
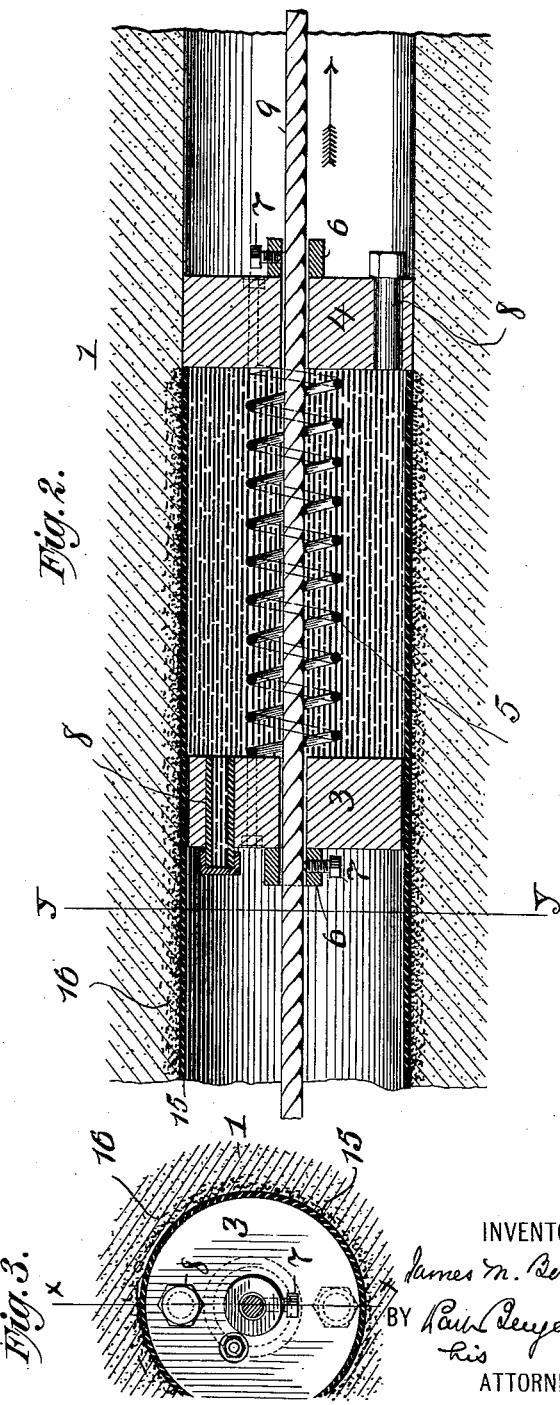
WITNESSES:
INVENTOR
James M. Boyle
BY Paul Benjamin
his
ATTORNEY

UNITED STATES PATENT OFFICE.

JAMES M. BOYLE, OF NEW YORK, N. Y., ASSIGNOR TO MONOLITHIC DUCT COMPANY, A CORPORATION OF NEW YORK.

MEANS FOR RENDERING CONDUITS IMPERVIOUS.

No. 907,724.  Specification of Letters Patent.  Patented Dec. 29, 1908.

Application filed February 20, 1907. Serial No. 358,429.

*To all whom it may concern:*

Be it known that I, JAMES M. BOYLE, a citizen of the United States, residing at New York, in the county of New York and State of New York, have invented a certain new and useful Improvement in Means for Rendering Conduits Impervious, of which the following is a specification.

The invention relates to means for rendering impervious a conduit formed of material more or less pervious to liquid. Such conduits are now made of various compounds of cement and sand, and they are generally pervious in proportion as the percentage of sand in the compound exceeds that of cement. There are many cases where such conduits will meet desired conditions of strength when the compound contains a relatively small proportion of cement, and hence is cheaper than other compounds containing more cement, but will fail to meet other conditions which require imperviousness to gases or liquids. These conditions arise when the conduits are used, for example, for the distribution of illuminating gas, or water, or as oil pipe lines. In such cases particularly, means for securing imperviousness effect a notable economy by enabling conduits of cheaper materials to be used.

My invention consists in combination with a conduit of means within the same for progressively transporting a body of liquid of suitable character to form a coating or fill the pores, into contact with the inner surface of said conduit; also in the means for maintaining said body of liquid under pressure whereby said conduit becomes saturated thereby; also in the various combinations of apparatus more particularly recited in the claims.

The term "progressively transporting" herein used, means the carriage and conveyance of a definite body of liquid as a mass through the conduit, in contradistinction to causing a current of said liquid to run through the conduit.

In the accompanying drawings—Figure 1 is a longitudinal section on the line *x x* of Fig. 3 of a cement conduit showing my device in place. Fig. 2 is a similar section showing said device in section. Fig. 3 is a section on the line *y y* of Fig. 2. Fig. 4 is a perspective view of the device separately.

Similar numbers of reference indicate like parts.

1 represents a portion of conduit formed of any more or less pervious material, such for example, as cement and sand.

2 is any receptacle for the liquid which is to be applied to the interior of the conduit in order to form an impervious coating. The means for applying said liquid consists of two pistons 3 and 4 preferably connected by a helical spring 5, which normally pulls said pistons together. Each piston has a central opening with an exterior sleeve 6, provided with a clamping screw 7; also extending through each piston near its circumferential edge is a tube 8 having its outer protruding portion threaded. The piston 3 fits loosely in the bore of the conduit. The piston 4 is of slightly larger diameter than piston 3, so that there will be frictional contact between its periphery and the surface of the conduit bore, but not enough frictional resistance to prevent said piston from being drawn through the conduit by the cord or wire 9, as hereinafter described. Said drawing cord may pass through the central openings in the pistons as shown in Figs. 1 and 2, but a preferable arrangement is that shown in Fig. 4, in which a short wire 10 is passed through the piston and bent to form eyes 11 at each end. To these eyes the drawing cord 9 and following cord 12 are attached. The advantage here is that the wire 10 is left permanently in place and forms a ready means of connection for the cords.

The operation is as follows: The piston 3 being brought to the end of the conduit as shown in Fig. 1, the pipe 13 leading from the liquid receptacle 2, is coupled to the end of tube 8 in said piston and the liquid allowed to flow into the space in the bore of the conduit between said pistons. The pressure of the liquid should be such as to force the pistons apart against the resilience of the spring. The tube 8 in piston 4 is uncapped. The set screw 7 of piston 3 is tightened (see Fig. 2) to clamp the cord or wire and the similar set screw of piston 4 is left loose. As soon as the space between pistons 3, 4, is completely filled with the liquid, the flow is cut off by valve 14 in pipe 13 and pipe 13 is uncoupled from tube 8 of piston 4, which tube is then capped. Draft is now applied to cord 9 in the direction of the arrow Fig. 2. As this cord passes loosely through piston 4, but is tightly clamped in piston 3, the effect is first to move the piston 3 toward piston 4. The tendency of the piston 3, acting through the liquid in the intermediate space, to move piston 4 is initially resisted by the friction between the circumferential periphery of piston 4 and the inner surface of the conduit bore. When, however, the strain is sufficiently great to overcome the resistance, the piston 4 begins its forward travel. The result is that the liquid in the space between piston 3 and piston 4, not only forms a coating on the interior of the bore as shown at 15, Fig. 2, but is forced by the constant pressure exerted upon it by piston 3, assisted by spring 5, directly into the pores of the material of the conduit for a certain depth, as shown at 16, and hardening there completely closes said pores. Meanwhile, as the device is drawn through the conduit the liquid in said space becomes gradually expended: but in direct proportion as this expenditure occurs the piston 3 is drawn nearer to piston 4 and thus the constant pressure on the liquid is maintained throughout the entire conduit length. When the device reaches the termination of the conduit, any liquid which may remain between the pistons may be drawn off by removing the cap from pipe 8 of piston 4, after which the entire device may be removed.

Any suitable liquid for producing the coating may be employed, such as pitch, cement grout, or the various known chemical compounds, or any liquid which it may be desired to combine with the material of the conduit to produce imperviousness. The cubic contents of the liquid receiving space between pistons 3 and 4 will, of course, be initially adjusted with respect to the superficies of bore to be covered, and to the perviousness of the material of the conduit. Thus if the conduit to be treated is say fifty feet long, the aforesaid liquid receiving space will be greater than for a conduit but twenty-five feet long. And so also if the material of the conduit be very pervious, as where a small proportion of cement is combined with a relatively large proportion of sand, more liquid receiving space per given length of conduit will be needed than if the material should contain a larger proportion of cement to sand, and hence be less pervious. This adjustment of the liquid receiving space and hence of the amount of liquid initially provided is easily determined at the outset by experiment and calculation for any given length and any given material of conduit.

It will, of course, be obvious that the spring 5 may be omitted, but it is preferably present because in case the pull in the cord 9 is intermitted for a short interval the spring will during that interval continue to exert pressure on the liquid in the space between pistons 3 and 4.

I claim:

1. The combination of two pistons, means for admitting liquid through one of said pistons to the space between them, means connecting said pistons for causing the same to exert pressure on said liquid and means for drawing a piston through said conduit.

2. The combination of two pistons of different diameters, means for admitting liquid through the piston of smaller diameter to the space between said pistons, means for subjecting the liquid in said space to pressure and means for drawing said pistons through a conduit.

3. The combination of two pistons, a rod or cord secured to one piston and passing freely through a central opening in the other piston, and a spring interposed between said pistons and normally tending to draw them together.

4. The combination of two pistons, a rod or cord passing freely through central openings in said pistons and means for clamping said pistons to said rod.

5. The combination of two pistons, a rod or cord secured to one piston and passing freely through a central opening in the other piston and means for admitting liquid through said first piston to the space between said pistons.

6. The combination of two pistons, a rod or cord secured to one piston and passing freely through a central opening in the other piston, detachable means for supplying liquid under pressure through an opening in said first piston to the space between said pistons and means for closing said opening upon the disconnection of said liquid supplying means.

7. The combination of two pistons, a rod or cord secured to one piston and passing freely through a central opening in the other piston, means for admitting liquid through one of said pistons to the space between them and means disposed between said pistons for causing them to exert pressure on said liquid.

In testimony whereof I have affixed my signature in presence of two witnesses.

JAMES M. BOYLE.

Witnesses:
WM. H. SIEGMAN,
GERTRUDE T. PORTER.